Figure 1:
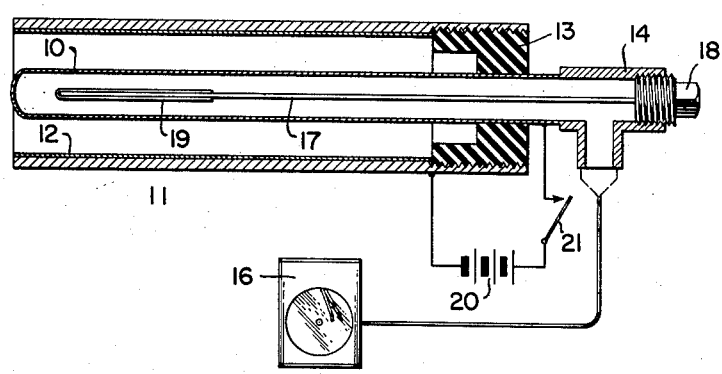

Dec. 30, 1958     H. L. HANSON     2,866,329

GAS ANALYSIS APPARATUS

Filed March 22, 1955

INVENTOR.
HENRY L. HANSON

BY *Arthur H. Swanson*

ATTORNEY.

United States Patent Office 2,866,329
Patented Dec. 30, 1958

2,866,329

GAS ANALYSIS APPARATUS

Henry L. Hanson, Willow Grove, Pa., assignor to Minneapolis-Honeywell Regulator Company, Minneapolis, Minn., a corporation of Delaware Application March 22, 1955, Serial No. 495,980

3 Claims. (Cl. 73—23)

A general object of the present invention is to provide a new and improved apparatus useful in the analysis of gases. More specifically, the present invention is concerned with improving the characteristics of a selectively sensitive member which is adapted to sorb from an atmosphere a selected gas or gaseous constituent or permeate a selected gas.

In a copending application of Richard B. Beard, Serial No. 364,711, filed June 29, 1953, there is disclosed a gas partial pressure measuring apparatus. This measuring apparatus comprises a tube of palladium which is projected into a heated atmosphere which normally contains hydrogen as well as other gases. Inasmuch as palladium is selectivitely permeable to hydrogen, hydrogen will permeate through the tube into an enclosed chamber where the hydrogen partial pressure may be measured. The efficient operation of palladium as a permeable element has heretofore required that the palladium be heated to a relatively high temperature, such as 1,000° F. or higher. In the case of silver, which is selectively permeable to oxygen, it has been found that its permeation rate even under ideal conditions is quite low. The increase in permeation rate is desirable to extend the field of application and use of such apparatus.

It is accordingly another object of the present invention to provide a gaseous sensing apparatus of the selectively permeable type which has an improved response and permeation rate.

In another copending application of Richard B. Beard, Serial No. 389,418, filed October 30, 1953, there is disclosed and claimed a gaseous constituent measuring means in the form of a thermocouple which has at least one leg which is adapted to sorb the selected constituent from the atmosphere. Many of the processes involved in sorbing a gaseous constituent into a metal as described in the above application are also present in the apparatus using a gaseous permeable member. In both instances, it is necessary that the selected gas get onto the surface of the metal by the process known as adsorption and to move into the metal by the process known as absorption. The most difficult obstacle to overcome is the getting of the selected gas onto the surface so that it may readily move into or through the selective metal used.

Another object of the invention is therefore to increase the rate at which a gaseous constituent will be taken onto the surface of the selective metal used in a measuring process.

It has been found that radioactive particles emitted from a radioactive source will ionize gases in the immediate vicinity of the source. The presence of the ionized gases around a metal which is intended to pick up the gas greatly increases the rate at which the selected gas will be adsorbed by the surface of the metal. In addition, there are indications that the radioactive particles striking the surface of the metal change the surface structure in such a manner as to enhance the ability of the surface to pick up the desired gaseous constituent.

A further object is therefore to provide an improved apparatus for getting a gaseous constituent onto the surface of a metal utilizing a source of radioactive energy.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described preferred embodiments of the invention.

Figure 2:
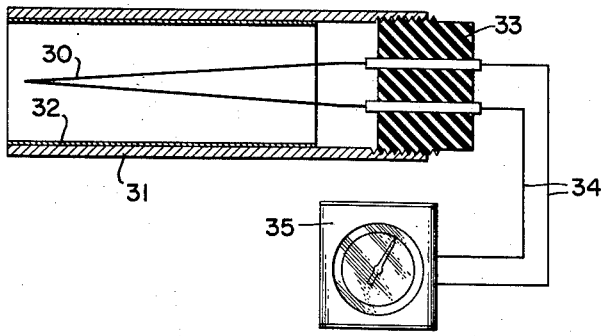
Figure 3:
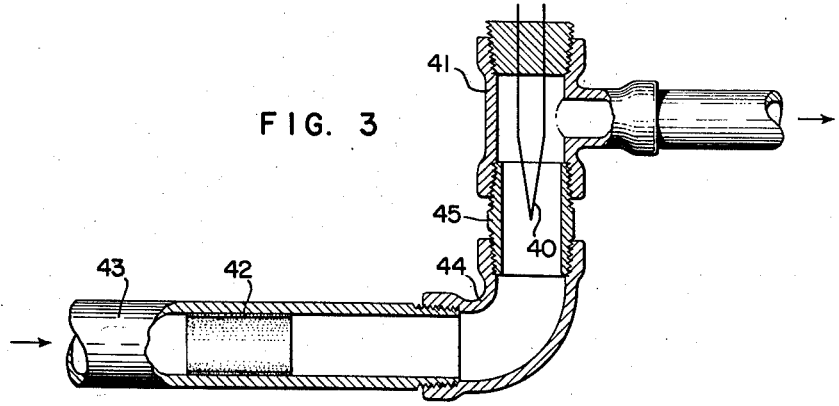
Figure 4:
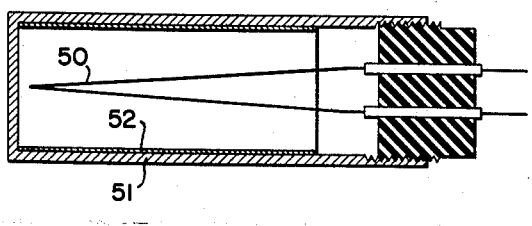

Of the drawings:

Fig. 1 represents schematically the principles of the invention applied to a gaseous permeable member;

Fig. 2 schematically shows the apparatus when a thermo-couple is included as the sensing means in the apparatus;

Fig. 3 shows the apparatus of Fig. 2 modified for ionization of the gas to be analyzed; and Fig. 4 shows schematically a compensating element which may be used with the apparatus of Fig. 2.

*Figure 1*

Referring first to Fig. 1, the numeral 10 represents a gaseous permeable tube. For purposes of illustration and example, the tube 10 will be assumed to be a silver tube which has a high selective permeability to oxygen. However, it is to be understood that the tube 10 may be formed of many other materials, such as platinum or palladium, the latter having a high selective permeability to hydrogen.

Surrounding the tube 10 is a protective sleeve 11 which may or may not be perforated depending on the type of gaseous circulation desired around the tube 10. On the inner surface of the sleeve 11 is a layer of radioactive material 12. This radioactive material may, in the assumed example, be strontium 90. This particular energy source is selected here because of its forming an excellent source of beta particles. The sleeve 11 is supported on the tube 10 by a block of electrical insulating material 13.

A T fitting 14 is fastened to the outer end of tube 10. This fitting has an outlet pressure connection at 15 which may lead to a suitable pressure measuring instrument 16 of conventional type.

Mounted in a plug 18 and extending through the fitting 14 is an elongated rod 17. On the outer end of the rod 17 is a further radioactive source of energy 19, the latter of which is preferably of the same type as the source 12. A battery 20 and cooperating switch 21 may be used to establish a desired biasing potential in the apparatus.

In operation, the tube 10 and sleeve 11 may be arranged for projection into an atmosphere wherein a desired gas concentration is to be measured. Under normal circumstances when the atmosphere is heated, the permeable tube 10 will be heated. When so heated, the selected gas, oxygen as here assumed, will permeate through the tube to set up in the tube an oxygen pressure proportional to the partial pressure of the oxygen in the atmosphere under examination. The partial pressure is then measured by the indicator 16.

Gaseous permeable elements have been found to have certain optimum temperature ranges where gases will pass therethrough. Under some conditions, it is impossible to operate the elements at their optimum temperature range so that additional means must be provided to enhance the permeation rate.

In the case of silver when used as tube 10, it is essential that some action be taken to increase the ability of the tube to pass the oxygen to the inside, or to the outside, depending on whether the partial pressure of the oxygen in the atmosphere is greater or less than the pressure in the tube. The radioactive sources of energy 12 and 19 provide a means for enhancing the rate at which gases will permeate through the tube 10. Firstly, the radioactive particles will ionize the gases in the vicinity of the tube 10 to thus "activate" the gas so that it may be more readily picked up on the surface of the tube. Secondly, the radioactive particles striking the surface of the tube 10 will change the character of the surface so that it will be better conditioned to pick up the ionized gas. Thus, in the case of beta particles striking a silver tube, the electrons of the surface molecules are driven into higher energy bands than normally present in non-bombarded metal. With some of the electrons so displaced, it is possible for the activated ions to combine on the surface much more readily. This combined action greatly speeds up the rate at which an equilibrium can be established between the partial gas pressure of the atmosphere and the pressure within the tube 10.

To enhance the movement of the ionized molecules in the gas toward the tube 10, the biasing battery 20 may be used. The bias must be in a direction to move the desired ions toward the tube 10.

*Figure 2*

In Fig. 2, the apparatus comprises a gaseous sensing thermocouple which may be of the type disclosed in the above-mentioned Beard application 389,418. Surrounding this thermocouple 30 is a protective sleeve 31. The sleeve 31 has a radioactive source of energy 32 formed on the inner surface thereof so that the particles emitted by the source will strike the thermocouple 30 as well as ionize the gas in the vicinity of the thermocouple.

The thermocouple 30 is mounted in a plug 33 which threadedly engages the tube 31. The output of the thermocouple is by way of leads 34 which are connected to a suitable indicating instrument 35 which may well be of the self balancing potentiometric type disclosed in the patent to Walter P. Wills, No. 2,423,540, issued July 8, 1947.

The operation of Fig. 2 is basically the same as Fig. 1 in that the radioactive source 32 acts to ionize the gas in the vicinity of the thermocouple 30. Further, the radioactive particles strike the surface of the thermocouple to "activate" the surface so that it will more readily pick up the desired gas ions. As explained in the Beard application 389,418, when the thermocouple picks up gas in one of its elements or legs, the output potential of the thermocouple will change in accordance with the concentration of the particular gas being measured.

*Figure 3*

As some types of thermocouple junctions will react directly to the radioactive source, it is necessary to separate the thermocouple from the direct radiation from the source to which it is still desirable to expose the thermocouple to the ionized gases. This may be achieved by an apparatus of the type shown in Fig. 3.

In Fig. 3, a thermocouple 40 is shown projecting through the straight section of a T fitting 41. A radioactive source 42 is positioned in a conduit 43 which is coupled to the T section 41 by an L coupling 44 and a close nipple 45. The radioactive source 42 acts to ionize the gases flowing through the conduit 43. The ionized gases pass through the L section 44 and nipple 45 to the space wherein the thermocouple 40 is positioned. The particular gas to be measured will be picked up by the thermocouple sensitive element or leg and there will be an output voltage proportional to the gas picked up. It will be readily apparent that the thermocouple 40 is not in the line of any directly radiated particles so that the thermocouple output voltage will be affected only by the gases flowing past the thermocouple.

*Figure 4*

Where direct exposure of the thermocouple to radiation is desirable but it does introduce an error, a compensating element, such as disclosed in Fig. 4, may be used. Here, a thermocouple 50 is placed inside of an enclosure 51.

This enclosure is sealed from the gases to which the unit of Fig. 2 is exposed. The housing 51 has a radioactive energy source formed on the wall thereof at 52.

By exposing the thermocouple 50 to the same amount of radiation as thermocouple 30, it is possible to so connect them that the effects of direct radiation on the couples will be cancelled out and the output will be a measure only of the gas which is to be measured. In addition to direct radiation compensation, there will be ambient temperature compensation in the manner set forth in the Beard application 389,418.

While, in accordance with the provisions of the statutes, there has been illustrated and described the best forms of the invention known, it will be apparent to those skilled in the art that changes may be made in the form of the apparatus disclosed without departing from the spirit of the invention as set forth in the appended claims, and that in certain cases, certain features of the invention may be used to advantage without a corresponding use of other features.

Having now described the invention, what it is desired to secure by Letters Patent is:

1. Apparatus for analyzing a gas comprising an enclosed chamber having as one wall thereof a gaseous permeable member, a pair of radioactive sources positioned so that radiation particles from one source will strike said member on one side and the radioactive particles from the other source will strike the other side of said member, and pressure measuring means connected to said chamber.

2. In combination, an elongated tubular member of gas permeable material, said member forming the inlet to an enclosed chamber, a sleeve formed of a radioactive energy source displaced from and surrounding a portion of said member, a second source of radioactive energy positioned within said member, and pressure measuring means connected to said chamber.

3. In apparatus for analyzing a gas, the combination comprising a gas permeable member at least partly defining an enclosed chamber, and a radioactive source of energy positioned adjacent said member and spaced therefrom so that radioactive particles will pass through the gas to be analyzed and strike the surface of said member, said source ionizing the gas in the vicinity of the surface of said member to increase the permeation of gases through said member into said chamber, a source of biasing potential connected to act between said source and the surface of said member to cause therebetween an ionic current flow, and pressure measuring means connected to said chamber.

References Cited in the file of this patent
UNITED STATES PATENTS

| | | |
|---|---|---|
| 1,559,461 | Ruben | Oct. 27, 1925 |
| 2,400,940 | McCollum | May 28, 1946 |
| 2,456,163 | Watson | Dec. 14, 1948 |
| 2,526,038 | Nelson | Oct. 17, 1950 |
| 2,627,543 | Obermaier | Feb. 3, 1953 |
| 2,637,208 | Mellen | May 5, 1953 |

OTHER REFERENCES

Text: "Hydrogen in Metals" by Donald P. Smith, University of Chicago Press, 1948, pages 70, 190, 239, 282.
Metals Reference Book, Smithels, pp. 387–389.